(12) United States Patent
Gunna et al.

(10) Patent No.: US 9,354,886 B2
(45) Date of Patent: May 31, 2016

(54) MAINTAINING THE INTEGRITY OF AN EXECUTION RETURN ADDRESS STACK

(75) Inventors: Ramesh B. Gunna, San Jose, CA (US); Peter J. Bannon, Concord, MA (US); Andrew J. Beaumont-Smith, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 981 days.

(21) Appl. No.: 13/304,885

(22) Filed: Nov. 28, 2011

(65) Prior Publication Data

US 2013/0138931 A1    May 30, 2013

(51) Int. Cl.
*G06F 9/38* (2006.01)

(52) U.S. Cl.
CPC ............ *G06F 9/3806* (2013.01); *G06F 9/3855* (2013.01); *G06F 9/3861* (2013.01)

(58) Field of Classification Search
CPC ... G06F 9/3804; G06F 9/3806; G06F 9/3842; G06F 9/3844
USPC .................................. 712/202, 233, 238, 240
See application file for complete search history.

(56) References Cited

U.S. PATENT DOCUMENTS

| 5,574,871 | A | * | 11/1996 | Hoyt et al. ..................... 712/200 |
| 5,604,877 | A | * | 2/1997 | Hoyt et al. ..................... 712/243 |
| 5,732,272 | A | | 3/1998 | Gochee |
| 5,768,576 | A | | 6/1998 | Hoyt et al. |
| 5,822,575 | A | | 10/1998 | Tran |
| 5,845,323 | A | | 12/1998 | Roberts et al. |
| 5,848,433 | A | | 12/1998 | Tran et al. |
| 5,850,543 | A | * | 12/1998 | Shiell et al. ................... 712/238 |
| 5,881,278 | A | | 3/1999 | Tran et al. |
| 5,964,868 | A | * | 10/1999 | Gochman et al. ............. 712/234 |
| 6,016,533 | A | | 1/2000 | Tran |

(Continued)

FOREIGN PATENT DOCUMENTS

EP    1513062    3/2005

OTHER PUBLICATIONS

International Search Report in Application No. PCT/US2006/028196, Mailed Jan. 8, 2007.

(Continued)

*Primary Examiner* — Jacob A Petranek
(74) *Attorney, Agent, or Firm* — Rory D. Rankin; Meyertons, Hood, Kivlin, Kowert & Goetzel, P.C.

(57) ABSTRACT

A processor and method for maintaining the integrity of an execution return address stack (RAS). The execution RAS is maintained in an accurate state by storing information regarding branch instructions in a branch information table. The first time a branch instruction is executed, an entry is allocated and populated in the table. If the branch instruction is re-executed, a pointer address is retrieved from the corresponding table entry and the execution RAS pointer is repositioned to the retrieved pointer address. The execution RAS can also be used to restore a speculative RAS due to a mis-speculation.

20 Claims, 9 Drawing Sheets

(56) References Cited

U.S. PATENT DOCUMENTS

| | | | |
|---|---|---|---|
| 6,073,230 | A | 6/2000 | Pickett et al. |
| 6,138,213 | A | 10/2000 | Mcminn |
| 6,151,671 | A * | 11/2000 | D'Sa et al. .............. 712/239 |
| 6,170,054 | B1 | 1/2001 | Poplingher |
| 6,269,436 | B1 | 7/2001 | Tran et al. |
| 6,314,514 | B1 | 11/2001 | Mcdonald |
| 6,912,648 | B2 * | 6/2005 | Hammarlund et al. ....... 712/219 |
| 7,320,066 | B2 * | 1/2008 | Yokoi .............. 712/239 |
| 7,836,290 | B2 | 11/2010 | Chaudhry et al. |
| RE42,466 | E * | 6/2011 | Yokoi .............. 712/239 |
| 2003/0120906 | A1 | 6/2003 | Jourdan et al. |
| 2003/0149865 | A1 | 8/2003 | Kadambi |
| 2005/0050278 | A1 | 3/2005 | Meier et al. |
| 2006/0095895 | A1 | 5/2006 | K. |
| 2008/0301420 | A1 * | 12/2008 | Inoue ................. 712/240 |
| 2011/0016292 | A1 * | 1/2011 | McDonald et al. ......... 712/208 |
| 2012/0017214 | A1 | 1/2012 | Shannon et al. |

OTHER PUBLICATIONS

Powell, et al., "Reducing Set-Associative Cache Energy via Way-Prediction and Selective Direct-Mapping", Microarchitecture, 2001. Micro-34 Proceedings, 34th ACM/IEEE International Symposium on Dec. 1-5, 2001, Piscataway, NJ, USA, IEEE, pp. 54-65, XP010583671 ISBN: 0-7965-1369-7.

Skadron, et al., "Improving Prediction for Procedure Returns with Return-Address-Stack Repair Mechanisms", Published in the Proceedings of the 31st Annual ACM/IEEE International Symposium on Microarchitecture, Nov. 30-Dec. 2, 1998, Dallas, Texas, USA, IEEE, pp. 259-271.

Non-Final Office Action in U.S. Appl. No. 13/893,898, mailed Dec. 18, 2015, 10 pages.

* cited by examiner

Sample Code
70

1. add
2. mul -> reg-1
3. store reg-1, [address A]
4. sub
5. load [address A], reg-2
6. add
7. add
8. blx reg-2

Timing Diagram
72

F1 = fetch (instructions 1-4)
F2 = fetch (instructions 5-8)
D1= decode (instructions 1-4)
D2= decode (instructions 5-8)
E1 = execute (instructions 1-2)
E2 = execute (instructions 4-6)
E3 = execute (instructions 7-8)
E4 = execute (instruction 3) -- issues late due
    to the latency of instruction 2

MAINTAINING THE INTEGRITY OF AN EXECUTION RETURN ADDRESS STACK

BACKGROUND

1. Field of the Invention

The present invention relates generally to processors, and in particular to methods and mechanisms for implementing return address stacks in processors.

2. Description of the Related Art

A typical processor utilizes a return address stack (RAS) for storing the address from which a program will fetch the next instruction when returning from a function call. In most stretches of a program, instructions may be executed sequentially from contiguous locations in memory. At some point, a call instruction may be executed to jump to a function, and instructions may be fetched from the memory location of the function. When the function has completed, the program will need to return to its previous place in memory for fetching instructions. Therefore, the return address is stored onto a RAS when a call instruction is executed. Typically the return address is the next address following the call instruction.

Maintaining the accuracy of a RAS can be challenging when processors support out-of-order execution of instructions, especially for load and store memory operations. Processors generally include support for load and store memory operations to facilitate transfer of data between the processors and memory. A load memory operation (or, more briefly, a load) is a memory operation specifying a transfer of data from a memory to the processor (although the transfer may be completed in cache). A store memory operation (or, more briefly, a store) is a memory operation specifying a transfer of data from the processor to memory. Loads and stores may be an implicit part of an instruction which includes a memory operation, or may be explicit instructions. In an out-of-order machine, when loads and stores execute speculatively, it is possible that a load instruction may need to be re-executed if a previous store to the same address is delayed. Accordingly, it is possible for the execution RAS to be corrupted with erroneous data due to instructions being re-executed.

SUMMARY

In one embodiment, a processor may include one or more execution units coupled to an execution return address stack (RAS). The processor may be configured to support execution of speculative load and store instructions. In certain situations, executing speculative loads and stores may cause one or more branch instructions to be re-executed. In one embodiment, a technique may be utilized for maintaining the integrity of the execution RAS in the presence of speculatively executed load and store instructions.

The processor may include a branch information table (BIT), and the BIT may include entries for branch instructions, such as call or return instructions, which are executed by the processor. When a branch instruction is fetched and decoded for the first time, an entry may be allocated in the BIT for the branch instruction. When the branch instruction is executed for the first time, the execution RAS may be accessed at an entry corresponding to a specific pointer location. For a call instruction, a corresponding return address may be pushed onto the execution RAS at the specific entry. For a return instruction, a return address may be popped from the specific entry of the execution RAS.

After the execution RAS has been accessed by the branch instruction, the entry that was allocated in the BIT for the branch instruction may be back-annotated with the specific RAS pointer location. This pointer location may be stored in the BIT entry and may be utilized if the corresponding branch instruction is re-executed. The BIT entry may also include a status indicator and an index number associated with the corresponding branch instruction.

A load-store dependency may result in the original branch instruction being re-issued and re-executed. If the branch instruction is re-executed, a search of the BIT may be performed to find the entry associated with the branch instruction. The pointer location may be retrieved from the BIT entry, and then prior to accessing the execution RAS, the stack pointer may be repositioned to this specific pointer location. If the branch instruction is a call instruction, the data stored at the entry corresponding to the specific pointer location may be overwritten with the return address corresponding to the call instruction. If the branch instruction is a return instruction, a return address may be retrieved from the execution RAS entry indicated by the specific pointer location.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
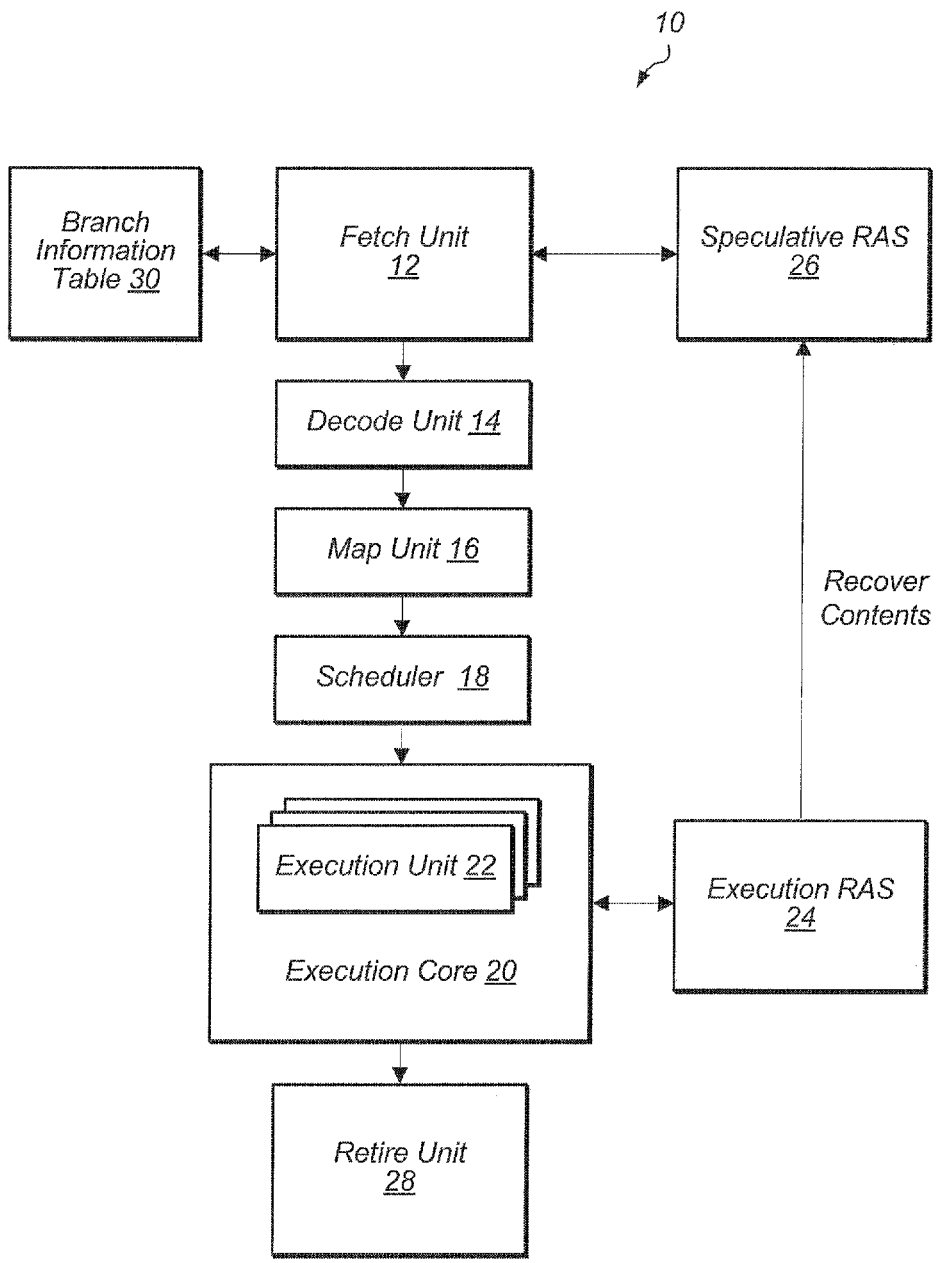
FIG. 1 is a block diagram that illustrates one embodiment of a portion of a processor pipeline.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a fetch unit . . . . " Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a processor having five execution units, the terms "first" and "second" execution units can be used to refer to any two of the five execution units.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of a processor pipeline is shown. In the illustrated embodiment, processor pipeline 10 includes a fetch unit 12, decode unit 14, map unit 16, scheduler 18, execution units 22 of execution core 20, execution return address stack (RAS) 24, speculative RAS 26, retire unit 28, and branch information table (BIT) 30. Execution RAS 24 and speculative RAS 26 may also be referred to as execution copy of the RAS 24 and speculative copy of the RAS 26, respectively.

Execution units 22 are representative of any number of execution units which may be part of execution core 20. Execution core 20 may include other units not shown in FIG. 1, such as an address generation unit, a translation unit, a data cache, and/or a load store unit. Although execution core 20 is shown as being coupled to retire unit 28, in other embodiments, there may be one or more units representing one or more additional stages of processor pipeline 10 in between execution core 20 and retire unit 28. Also, in another embodiment, retire unit 28 may be coupled to scheduler 18. It is noted that processor pipeline 10 may also include other stages and components not shown in FIG. 1.

Fetch unit 12 may include circuitry used to generate program counters (PCs) for fetching instructions. For example, fetch unit 12 may include branch prediction hardware used to predict branch instructions and to fetch down the predicted path. Fetch unit 12 may also be redirected (e.g., via misprediction, exception, interrupt, flush). Fetch unit 12 may also be referred to as a fetch controller or a fetch control unit.

Fetch unit 12 may also be coupled to speculative RAS 26, and speculative RAS 26 may provide speculative return addresses to fetch unit 12 for determining addresses from which to fetch instructions. For example, fetch unit 12 may pop a return address from speculative RAS 26 in response to decode unit 14 decoding a return instruction. Also, fetch unit 12 may push a return address onto speculative RAS 26 in response to decode unit 14 decoding a call instruction. In the event of a mis-speculation (i.e., misprediction), speculative RAS 26 may be corrupted with incorrect data. In such an event, the contents and pointer locations of speculative RAS 26 may be restored from execution RAS 24.

Fetched instructions may be decoded by decode unit 14. In one embodiment, decode unit 14 may be configured to generate microops for each received instruction. Decode unit 14 may also be configured to notify fetch unit 12 of any decoded branch instructions. As used herein, the term "branch instruction" may be used to refer to a "call instruction" or a "return instruction". In addition, the term "instruction" may be used to refer to an "instruction operation". For example, each instruction may translate to one or more instruction operations (e.g., microops) which, when executed, result in the performance of the operations defined for that instruction according to an instruction set architecture (ISA). Any of various ISAs may be utilized with the techniques described herein, such as PowerPC™, ARM™, MIPS™, SPARC™, x86, IA-64, as well as others.

Decode unit 14 may convey the decoded instructions to map unit 16. In one embodiment, map unit 16 may implement register renaming to map source register addresses from microops to source operand numbers identifying renamed source registers. Map unit 16 may convey mapped instruction operations to scheduler 18. Scheduler 18 may schedule instruction operations for execution to specific execution units 22 of execution core 20. Execution core 20 may include any number and type of execution units 22. For example, execution units 22 may include an integer unit, a floating point unit, a vector unit, a load store unit, and other types of execution units.

Execution unit(s) 22 may be coupled to execution RAS 24. A return address may be pushed onto execution RAS 24 when a call instruction is executed, and a return address may be popped from execution RAS 24 when a return instruction is executed. In one embodiment, execution RAS 24 may also store mode information which may be used to enable the processor to return to the correct mode when executing the instruction corresponding to the return address stored in execution RAS 24. For example, in the ARM ISA, instructions may execute in ARM or thumb mode, and so the type of mode in which the instruction (specified by the return address) should be executed may be stored along with the return address in an entry of execution RAS 24.

Dependencies on an older store operation may cause a call or return instruction to be executed more than once. For example, a first store operation may produce a first value, and then a first load may consume the data produced by the first store. The value produced by the first store operation may be based on the computation of a long-latency operation within processor pipeline 10. The first store may wait for a dependency on the operation that is producing the data, and so the first store may issue down pipeline 10 only when the dependency is resolved. Consequently, in some cases, the first load may be executed speculatively ahead of the first store.

When the first load executes speculatively, then the first load may wait in a load queue (not shown). In one embodiment, the first load may not retire until all previous operations are retired. In this particular example, if the first store has not executed, then the first load may not retire. When the first store executes, the first store may check its address against any younger loads that have executed in the pipeline. In this case, it will be determined that the first load has executed but it did not get the latest data. Therefore, the processor may go back and re-execute the first load. When this happens, the PC value of the first load instruction may be re-fetched and then instructions may be re-executed starting from that PC. In other words, instructions are fetched starting from the first load and then the first load and all other subsequent instructions are re-executed. Execution is taken back to the point of the first load instruction and execution continues on from that point. Some of the instructions that are re-executed may be branch instructions, which may cause execution RAS 24 to be corrupted.

When a branch instruction is re-executed, instead of accessing a new location, the execution RAS 24 may return to a previous location and start filling or popping entries from that location. The previous location may be where the original branch instruction accessed execution RAS 24 on its initial execution. As used herein, an access may be defined as a read or a write from execution RAS 24.

The information indicating where the branch instruction accessed execution RAS 24 on its first execution may be stored in branch information table (BIT) 30. In one embodiment, information about branch instructions may be written into entries of BIT 30 when branch instructions are dispatched from decode unit 14. When a branch instruction is re-executed, the previous RAS 0location may be retrieved from a corresponding entry in BIT 30, and then execution RAS 24 may be re-allocated from that point. In one embodiment, BIT 30 may be coupled to the fetch unit 12. In other embodiments, BIT 30 may be located elsewhere and/or coupled to one or more other units.

It is noted that other embodiments may include other combinations of units, including subsets or supersets of the units shown in FIG. 1 and/or other units. For example, other stages may be included within pipeline 10 in other embodiments. For example, in another embodiment, a dispatch queue may be included between decode unit 14 and scheduler 18 instead of map unit 16. While one instance of a given component or unit may be shown in FIG. 1, other embodiments may include two or more instances of the given component or unit. Similarly, throughout this detailed description, two or more instances of a given component or unit may be included even if only one is shown, and/or embodiments that include only one instance may be used even if multiple instances are shown.

Figure 2:
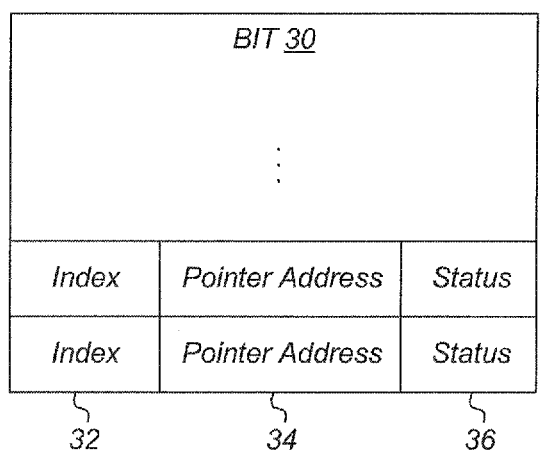
FIG. 2 is a block diagram that illustrates one embodiment of a branch information table (BIT).

Turning now to FIG. 2, a block diagram of one embodiment of a branch information table (BIT) is shown. When a branch instruction is decoded for the first time, an entry may be allocated in BIT 30 for the branch instruction, such that each decoded branch instruction has a separate BIT entry. Each separate branch instruction that is executed in the program may be assigned a unique index number 32 that is stored in a corresponding entry in BIT 30. In one embodiment, the index number 32 may be pipelined down the execution pipe with the branch instruction, from the fetch unit to the execution units.

Each entry in BIT 30 may also include a pointer address 34, which indicates where the stack pointer was in the execution RAS when the branch instruction previously executed. The pointer address 34 may be back-annotated into the entry of BIT 30 when the branch instruction is executed. When a branch instruction is decoded, it may be determined if this is the first time the branch instruction has been encountered in the pipeline. To perform this determination step, a lookup of BIT 30 may be performed to see if the current branch instruction has been previously executed. If there is an entry in BIT 30 corresponding to the branch instruction and if the execute status indicator 36 is set, then this indicates that the branch instruction has previously executed in the pipeline. In this case, pointer address 34 may be retrieved and utilized by the execution RAS pointer to return to that address on the execution RAS.

The first time the branch instruction is executed, the execution RAS may be accessed without repositioning the stack pointer. A PC may be a pushed into the execution RAS entry for a call instruction and a PC may be popped from the execution RAS entry for a return instruction. After the branch instruction accesses the execution RAS, the address of the execution RAS pointer may be back-annotated into the corresponding BIT entry. The next time around, when the same branch instruction is re-executed, a lookup of BIT 30 may be performed to see what the pointer address is for that particular branch instruction. Then, the processor may base accesses of the execution RAS from that pointer address for future branch instructions going forward. For a re-executed call instruction, the data in the previously accessed entry of the execution RAS may be overwritten, and in some cases, it may be the same data. In one embodiment, the data being pushed onto the execution RAS may be the next PC, which may be the PC of the branch instruction plus four or plus eight, depending on the size of the instruction.

Figure 3:
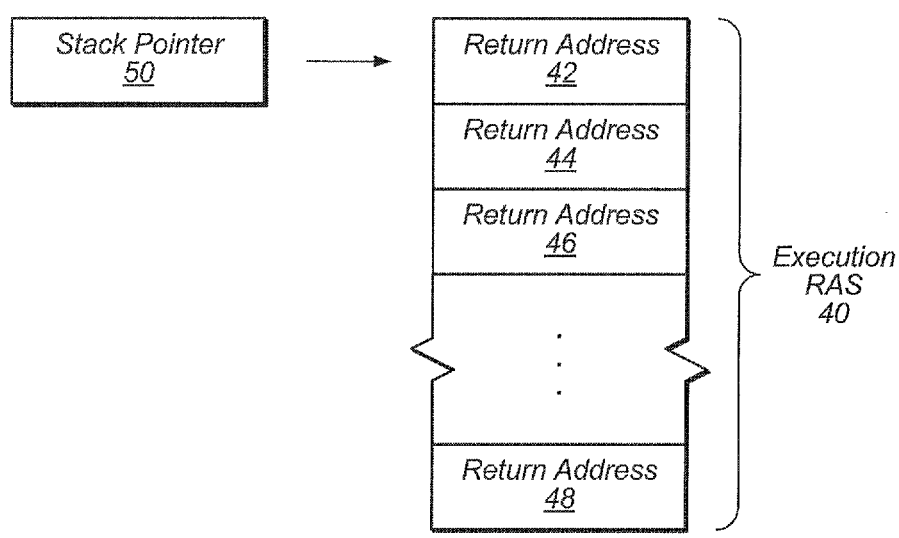
FIG. 3 is a block diagram that illustrates one embodiment of an execution return address stack (RAS).

Referring now to FIG. 3, a block diagram of one embodiment of an execution RAS is shown. Execution RAS 40 is shown in FIG. 3, and a speculative RAS may be organized in a similar fashion. Return addresses 42-48 are representative of any number of return addresses which may be stored in execution RAS 40. Return addresses 42-48 may also be referred to as "PCs". Stack pointer 50 may point to the top entry on the stack, which as shown in FIG. 3, is return address 42. In another embodiment, both a write and a read pointer may be utilized with execution RAS 40.

In one embodiment, execution RAS 40 may be as a last in first out (LIFO) structure. In another embodiment, execution RAS 40 may be a circular buffer. The mechanisms and techniques for maintaining an accurate copy of the execution RAS 40 may allow the processor microarchitecture to forgo keeping a retirement copy of the RAS. Execution RAS 40 may be the definitive copy of the RAS in some embodiments.

Figure 4:
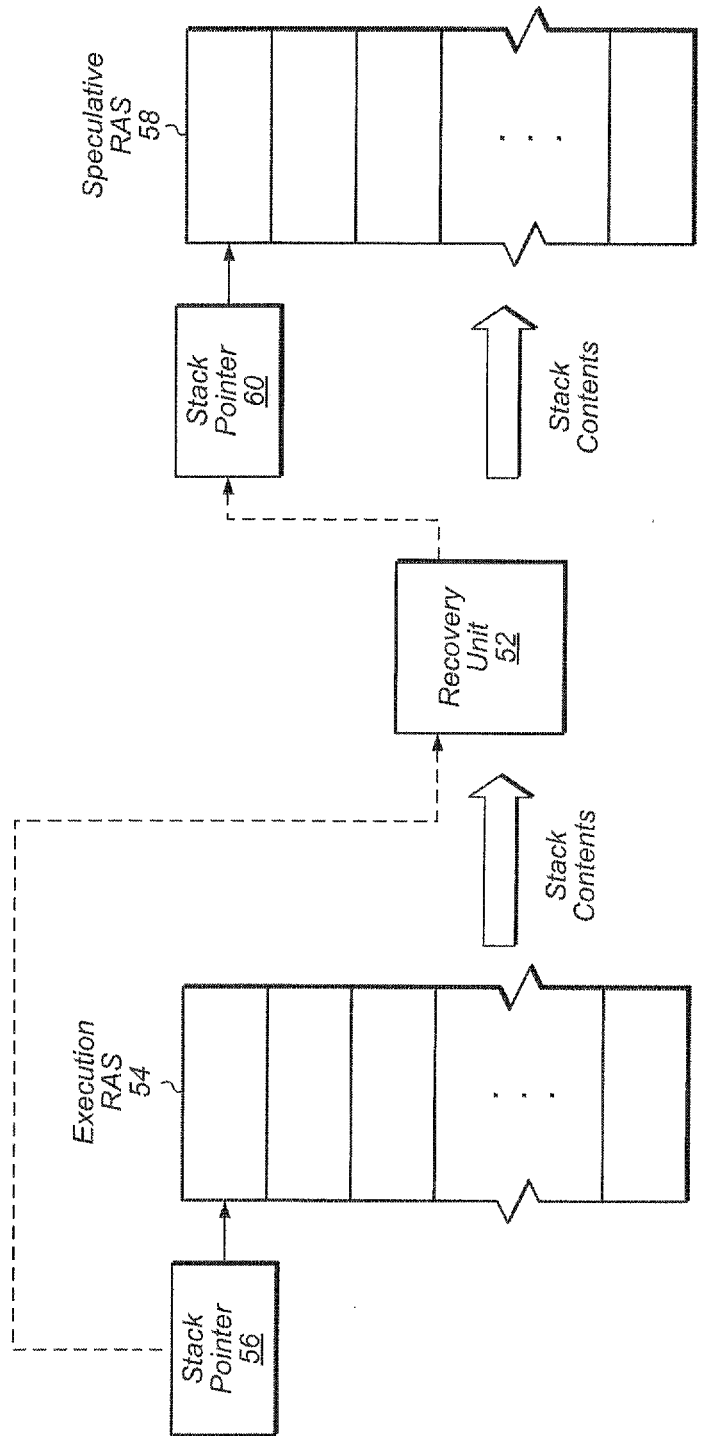
FIG. 4 is a block diagram of a recovery unit in accordance with one or more embodiments.

Turning now to FIG. 4, a block diagram of one embodiment of the operation of a recovery unit is shown. In response to detecting a misprediction, execution RAS 54 may be copied onto speculative RAS 58. Recovery unit 52 may copy the contents of execution RAS 54 to speculative RAS 58 in response to determining that speculative RAS 58 contains incorrect return address values due to a mis-speculation, exception, or other error. Recovery unit 52 may also reposition speculative stack pointer 60 to match the position of execution stack pointer 56.

Figure 5:
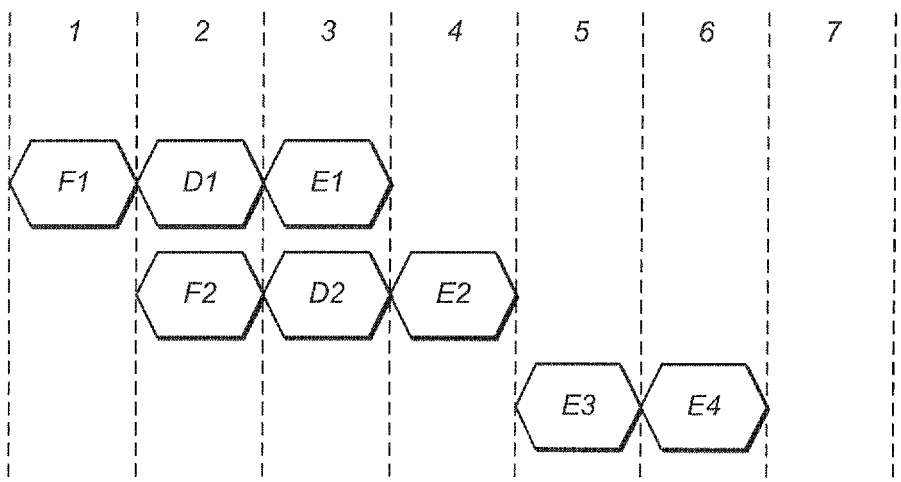
FIG. 5 is a sample instruction sequence from an illustrative program and a corresponding timing diagram.

Referring now to FIG. 5, a sample instruction sequence from an illustrative program and a corresponding timing diagram are shown. It is noted that the instruction sequence in sample code 70 is for illustrative purposes only, and other sequences of other types of instructions may occur in other scenarios. It is noted that the terminology and the notation of these instructions may vary from embodiment to embodiment. Other assembly languages may be utilized in other embodiments to implement the techniques disclosed herein.

As shown in FIG. 5, sample code 70 includes eight instructions. Sample code 70 may occur at any point within a given program. The instructions are labeled in the order in which they occur in the overall program, with number 1 being the oldest instruction and number 8 being the youngest instruction in this sequence. Processors typically retire instructions in program order. An instruction is younger than another instruction if it is subsequent to the other instruction in program order. An instruction is older than another instruction if the instruction is prior to the other instruction in program order. Similarly, instructions may be indicated as being prior to or subsequent to other instructions, or may be referred to as previous instructions, preceding instructions, subsequent instructions, etc. Such references may refer to the program order of the instructions.

The first instruction is an addition instruction "add", and then the second instruction is a multiply instruction "mul→reg-1", with the resultant product of the multiplication being stored in register "reg-1". The third instruction is a store instruction "store reg-1, [address A]", with the contents of reg-1 being stored at memory address A. The third instruction has a register dependency on the second instruction and may not be executed until the second instruction has executed and the result stored in "reg-1".

The fourth instruction is a subtraction instruction "sub". The fifth instruction is a load instruction with the data at "address A" being loaded into register "reg-2". The fifth and third instructions are to the same address (address A) and thus can impact processor consistency. Processor consistency is the notion that a most recently stored value should be the value that is retrieved by a lookup of the same address. The sixth and seventh instructions are addition "add" instructions. The eighth instruction is a branch with link instruction "blx reg-2", and the instruction may branch to the address stored in register "reg-2".

For purposes of this discussion, it will be assumed that four instructions may be fetched and decoded per clock cycle and that three instructions may be issued and executed per clock cycle. However, in other embodiments, other numbers of instructions may be fetched and decoded per clock cycle and/or other numbers of instructions may be issued and executed per clock cycle. In timing diagram 72, processor clock cycles are delimited by vertical dashed lines, and are numbered at the top (1 to 7). It is noted that, while some of the pipeline stages are illustrated as occurring in consecutive clock cycles, there may be intervening clock cycles in some cases.

The first fetch (F1), of instructions 1-4, may occur in clock cycle 1. The first decode stage (D1), of instructions 1-4, may occur in clock cycle 2. The first execution stage (E1) may execute instructions 1 and 2 in clock cycle 3. The first execution stage could potentially execute three separate instructions in clock cycle 3, but since instruction 3 is dependent on instruction 2, instruction 3 is not ready to be executed in clock cycle 3.

The second fetch (F2) of instructions 5-8 may occur in clock cycle 2. The second decode stage (D2) of instructions 5-8 may occur in clock cycle 3, and then the second execution stage (E2) of instructions 4-6 may occur in clock cycle 4. The third execution stage (E3) may execute instructions 7 and 8 in clock cycle 5. Finally, the fourth execution stage (E4) may execute instruction 3 in clock cycle 6. Instruction 3 issues late due to the latency of instruction 2. Although it is shown that E1, E2, E3, and E4 execute on consecutive clock cycles, in some embodiments, E4 may execute much later than the earlier three execution groups.

When the second fetch batch (F2) is decoded, the branch instruction of the call variety (blx) is detected and recorded in an entry of the BIT with an index Bn. Also, the execute status bit of the entry may be set to 0 on allocation, which indicates that the instruction has not executed in the pipeline. When E3 executes, the call instruction (blx) may push a return address on to the execution RAS, the allocation pointer (Ax) of the execution RAS may be recorded in the BIT entry associated with index Bn, and the execute status bit may be set to 1. When E4 executes, a load store unit may detect both that a younger load (instruction 5) has executed over-eagerly and that instruction 5 matches to the same address (address A) as an older store (instruction 3). The load store unit may initiate a re-execution starting with instruction 5 to maintain processor consistency. When instruction 5 re-executes, all of its dependent instructions, such as instruction 8, may be re-executed. When instruction 8 re-executes, the execute status field in the BIT entry of index Bn (corresponding to instruction 8) may be checked. Since the execute status field is '1', then the allocation pointer address "Ax" may be retrieved and the execution RAS allocation pointer may be restored to "Ax". Therefore, the allocation of the return address corresponding to instruction 8 may be written to RAS entry "Ax" and not to RAS entry "Ax+1". In this way, the creation of multiple entries for the same branch instruction is avoided, preventing an eventual overrun of the execution RAS.

Figure 6:
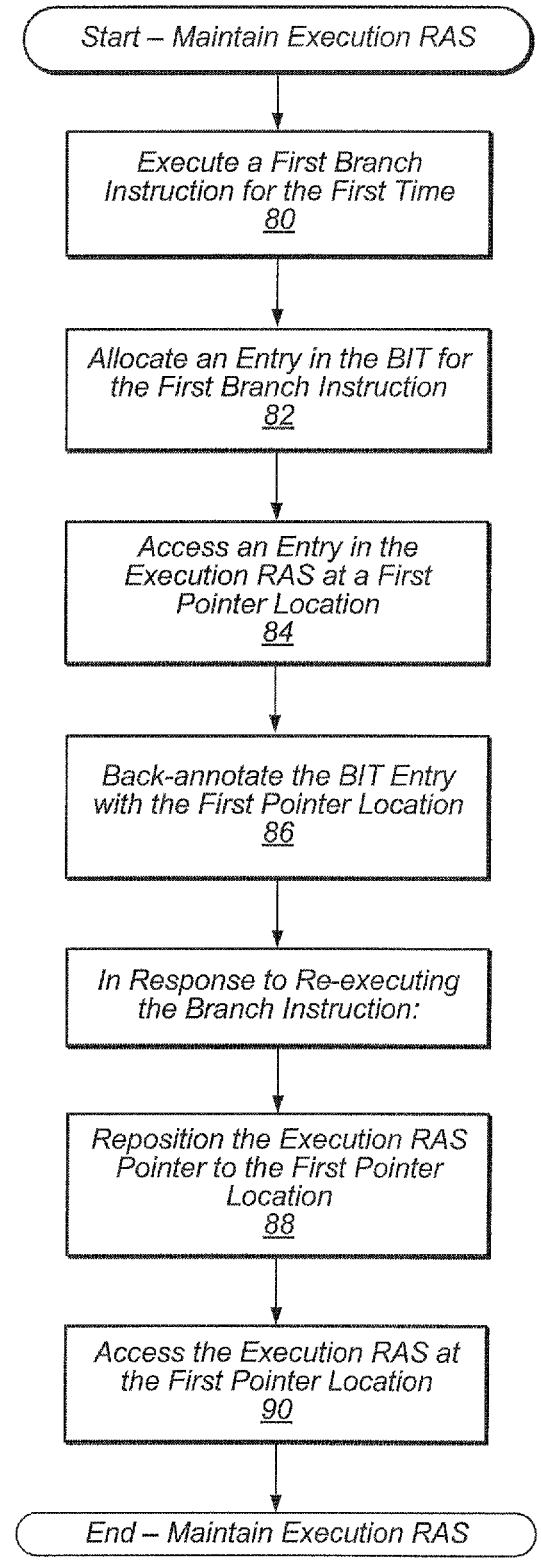
FIG. 6 is a generalized flow diagram illustrating one embodiment of a method for maintaining the integrity of an execution RAS.

Turning now to FIG. 6, one embodiment of a method for maintaining the integrity of an execution RAS is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A branch instruction may be executed for the first time (block 80). In one embodiment, the processor may determine if the branch instruction is executing for the first time by checking the BIT to see if an entry for the branch instruction already exists. The processor may allocate an entry in the BIT for the branch instruction (block 82). In one embodiment, the processor may allocate the BIT entry in response to decoding the branch instruction and before actually executing the branch instruction. The processor may also access an entry in an execution return address stack (RAS) at a first pointer location (block 84). The processor may push a return address onto the execution RAS if the branch instruction is a call instruction and pop a return address from the execution RAS if the branch instruction is a return instruction.

The BIT entry may be back-annotated with the first pointer location (block 86). In a subsequent clock cycle following the initial execution of the branch instruction, a load store dependency may cause the branch instruction to be re-executed. One or more other instructions may be executed in between the initial execution of the branch instruction and the re-execution of the branch instruction. In response to the branch instruction being re-executed, the execution RAS pointer may be repositioned to the first pointer location (block 88) and the execution RAS may be accessed at the first pointer location (block 90).

In one embodiment, when the branch instruction is re-executed, a lookup may be performed to the BIT, and it may be determined that the branch instruction has already been executed based on the presence of an entry associated with the branch instruction and the value of the execute status bit. The entry may include the first pointer location, and the first pointer location may be retrieved from the entry and utilized for the repositioning and accessing steps.

Figure 7:
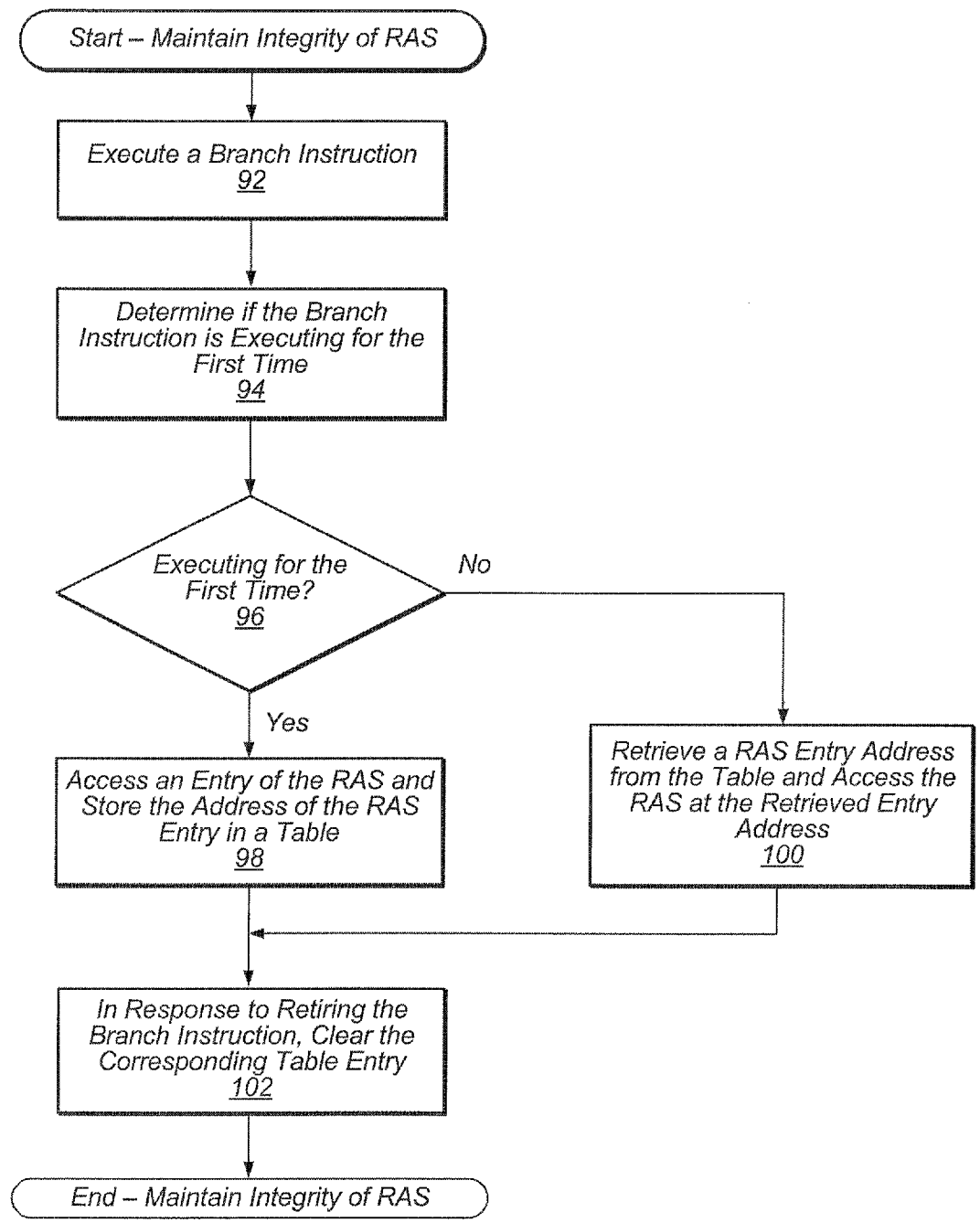
FIG. 7 is a generalized flow diagram illustrating one embodiment of a method for maintaining the integrity of a RAS.

Referring now to FIG. 7, one embodiment of a method for maintaining the integrity of a RAS is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a branch instruction may be executed (block 92). The branch instruction may be a call or return instruction. It may be determined by the processor if the branch instruction is executing for the first time (block 94). In one embodiment, a table may be utilized to store entries corresponding to branch instructions that have been executed by the processor. A search of the table may determine if the branch instruction has been previously executed. For example, a table entry corresponding to the branch instruction may include an execute status bit, which, if set to '1', may indicate that the branch instruction has been previously executed by the processor.

If the branch instruction is being executed for the first time (conditional block 96), then an entry of the RAS may be accessed and the address of the entry may be stored in the table (block 98). The RAS may be accessed at an entry pointed to the current pointer location. If the branch instruction is a call instruction, then a return address may be pushed into the RAS entry and if the branch instruction is a return instruction, then a return instruction may be popped from the RAS entry.

If the branch instruction is not being executed for the first time (conditional block 96), then a RAS entry address may be retrieved from the table and the RAS may be accessed at the retrieved entry address (block 100). Responsive to the processor retiring the branch instruction, the corresponding table entry may be cleared so that it may be used by subsequent branch instructions (block 102).

Figure 8:
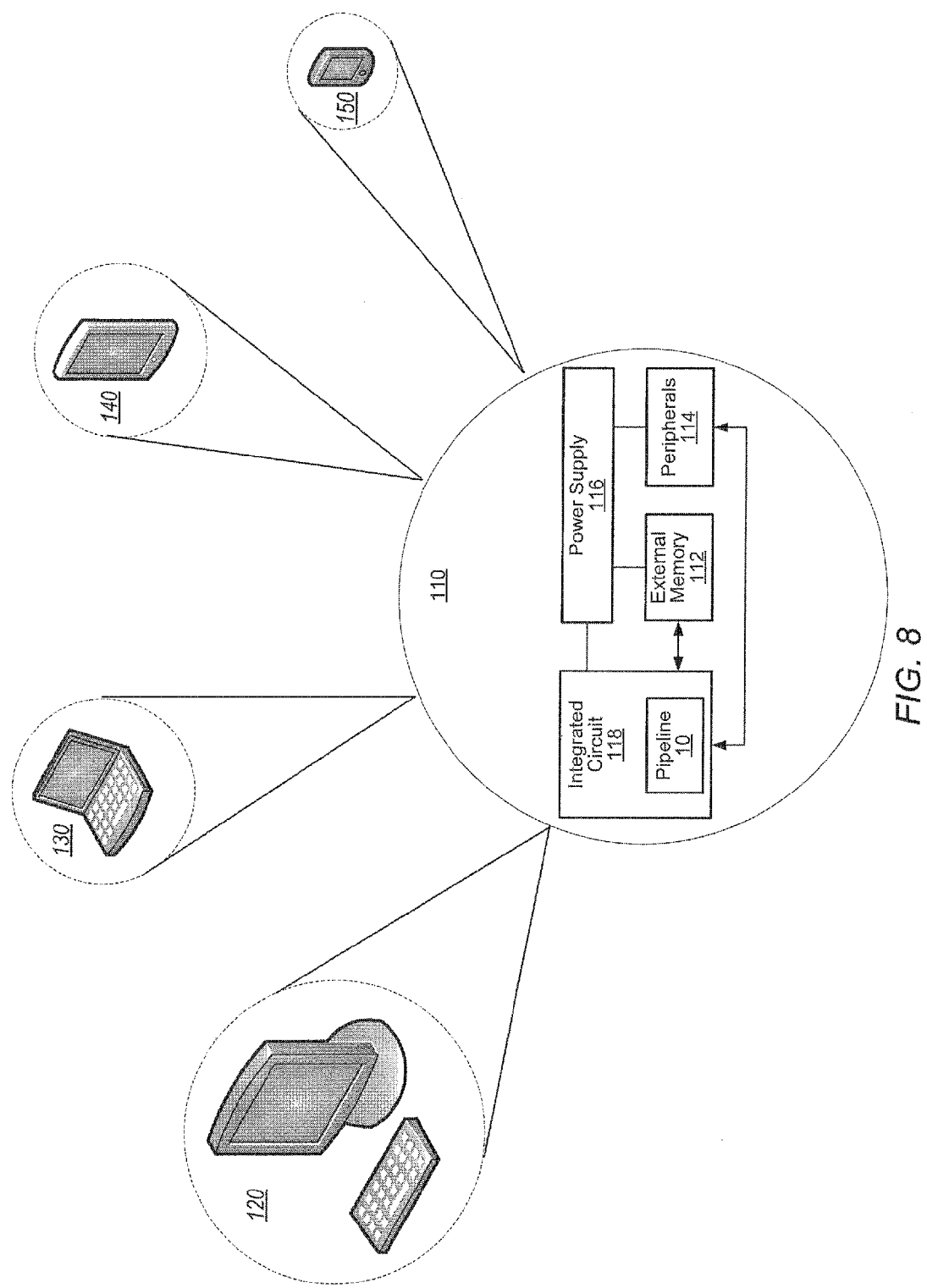
FIG. 8 is a block diagram of one embodiment of a system.

Turning next to FIG. 8, a block diagram of one embodiment of a system 110 is shown. As shown, system 110 may represent chip, circuitry, components, etc., of a desktop computer 120, laptop computer 130, tablet computer 140, cell phone 150, or otherwise. In the illustrated embodiment, the system 110 includes at least one instance of an integrated circuit 118 coupled to an external memory 112. Integrated circuit 118 may include one or more instances of processor pipeline 10 (of FIG. 1). In some embodiments, integrated circuit 118 may be a SoC with one or more processors and one or more processor pipelines 10.

The integrated circuit 118, which may also be referred to as an apparatus, is coupled to one or more peripherals 114 and the external memory 112. A power supply 116 is also provided which supplies the supply voltages to the integrated circuit 118 as well as one or more supply voltages to the memory 112 and/or the peripherals 114. In various embodiments, power supply 116 may represent a battery (e.g., a rechargeable battery in a smart phone, laptop or tablet computer). In some embodiments, more than one instance of the integrated circuit 118 may be included (and more than one external memory 112 may be included as well).

The memory 112 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with integrated circuit 118 in a chip-on-chip configuration, a package-on-package configuration, or a multi-chip module configuration.

The peripherals 114 may include any desired circuitry, depending on the type of system 110. For example, in one embodiment, peripherals 114 may include devices for various types of wireless communication, such as wifi, Bluetooth, cellular, global positioning system, etc. The peripherals 114 may also include additional storage, including RAM storage, solid state storage, or disk storage. The peripherals 114 may include user interface devices such as a display screen, including touch display screens or multitouch display screens, keyboard or other input devices, microphones, speakers, etc.

Figure 9:
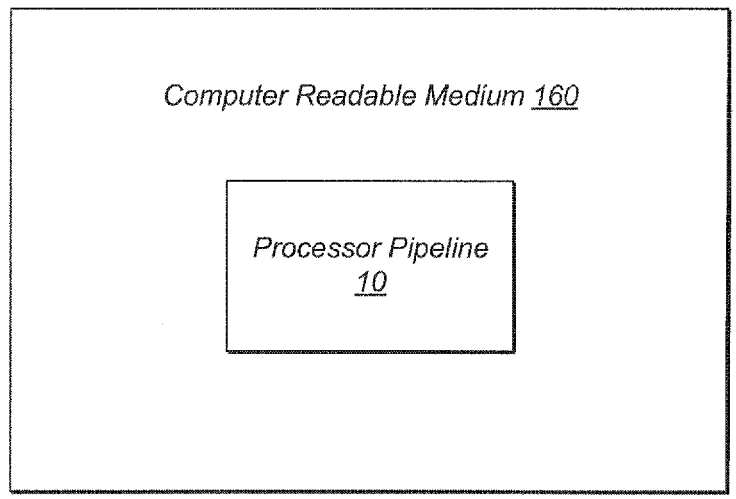
FIG. 9 is a block diagram illustrating one embodiment of a computer readable medium.

Referring now to FIG. 9, one embodiment of a block diagram of a computer readable medium 160 including one or more data structures representative of the circuitry included in processor pipeline 10 (of FIG. 1) is shown. Generally speaking, computer readable medium 160 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 160 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 160 may be the netlist(s) (with or without the synthesis library) or the data set(s), as desired. In yet another alternative, the data structures may comprise the output of a schematic program, or netlist(s) or data set(s) derived therefrom.

While computer readable medium 160 includes a representation of the pipeline 10, other embodiments may include a representation of any portion or combination of portions of pipeline 10 (e.g., fetch unit 12, execution RAS 24, BIT 30).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a branch information table (BIT);
a speculative return address stack; and
an execution return address stack;
wherein the processor is configured to:
in response to decoding a branch instruction and determining an entry does not exist for the branch instruction in the BIT:
allocate an entry in the BIT for the branch instruction; and
store an indication corresponding to the entry that indicates the branch instruction has not previously executed;
in response to executing the branch instruction and determining a stored indication for the branch instruction indicates the branch instruction has not previously executed:
store an address associated with an execution return stack pointer in the entry; and
update said indication to indicate the branch instruction has executed;
in response to executing the branch instruction and determining the indication indicates the branch instruction has previously executed, reposition the execution return address stack pointer to point to the first location by:
retrieving the address associated with the execution return address stack pointer from the BIT entry; and
restoring the execution return address stack pointer with the address.

2. The processor as recited in claim 1, wherein the processor is further configured to access the execution return address stack at the first location responsive to re-executing the branch instruction.

3. The processor as recited in claim 1, wherein the speculative return address stack is configured to:
update responsive to branch instructions being fetched and decoded; and
recover to a state of the execution return address stack responsive to a mis-speculation.

4. The processor as recited in claim 1, wherein the processor is further configured to copy contents of the execution return address stack to the speculative return address stack and reposition a speculative return address stack pointer to match a position of the execution return address stack pointer responsive to detecting a misprediction.

5. The processor as recited in claim 1, wherein the processor is configured to execute instructions speculatively.

6. An apparatus comprising:
one or more execution units configured to execute instructions;
a speculative return address stack;
an execution return address stack coupled to the one or more execution units; and
a branch information table (BIT);
wherein the apparatus is configured to:
search for a BIT entry corresponding to a branch instruction, responsive to decoding the branch instruction;
retrieve a pointer address from the BIT entry, responsive to finding a BIT entry corresponding to the branch instruction, wherein the pointer address corresponds to a previously accessed entry in the execution return address stack;
re-issue and re-execute the branch instruction responsive to detecting a load-store dependency mis-speculation; and
reposition a pointer to the retrieved pointer address by restoring the pointer with the retrieved pointer address from the BIT entry and access the execution return address stack using the pointer, responsive to re-executing the branch instruction and responsive to checking that an indication associated with the BIT entry indicates the branch instruction has previously executed.

7. The apparatus as recited in claim 6, wherein the branch instruction is re-executed due to a load store dependency.

8. The apparatus as recited in claim 6, wherein the branch instruction is a call instruction or a return instruction.

9. The apparatus as recited in claim 6, wherein the apparatus is configured to support out-of-order execution of instruction.

10. The apparatus as recited in claim 6, wherein the apparatus further comprises a speculative return address stack, and wherein the speculative return address stack is configured to:
update responsive to branch instructions being fetched and decoded; and
recover to a state of the execution return address stack responsive to a mis-speculation.

11. The apparatus as recited in claim 6, wherein each entry of the BIT comprises:
an index number of a corresponding branch instruction, wherein each branch instruction has a unique index number;
a pointer address of a return address stack entry accessed by the branch instruction; and
an execute status bit, wherein the execute status bit indicates whether the branch instruction has previously executed, and wherein the execute status bit is set to zero on allocation of a corresponding entry in the BIT.

12. A method comprising:
executing a branch instruction for a first time;
allocating an entry in a branch information table (BIT) for the branch instruction and setting an execute status bit associated with the entry to indicate the branch instruction has executed, responsive to execution of the instruction;
accessing an entry in an execution return address stack at a first pointer location;
back-annotating the BIT entry with the first pointer location;
responsive to re-executing the branch instruction due to a mis-speculation:
repositioning a return address stack pointer to the first pointer location responsive to determining the branch instruction has previously executed, wherein repositioning is performed by (i) retrieving the first pointer location from the BIT entry and (ii) restoring the return address stack pointer with the first pointer location; and
accessing the execution return address stack using the repositioned return address stack pointer.

13. The method as recited in claim 12, further comprising determining if the branch instruction has been previously executed by checking the BIT for an entry corresponding to the branch instruction.

14. The method as recited in claim 12, wherein subsequent to executing the branch instruction for the first time and prior to re-executing the branch instruction, the method further comprising executing one or more other branch instructions.

15. The method as recited in claim 12, wherein each branch instruction is assigned a unique index number.

16. The method as recited in claim 12, further comprising restoring a speculative return address stack with the execution return address stack responsive to detecting said mis-speculation.

17. A method comprising:
  executing a branch instruction;
  determining if the branch instruction is being executed for the first time;
  responsive to determining the branch instruction is being executed for the first time:
    accessing an entry of an execution return address stack;
    storing an address of the entry in an entry of a branch information table (BIT); and
    setting an execute status bit of the BIT entry to indicate the branch instruction has executed;
  re-issuing and re-executing the branch instruction responsive to mis-speculation;
  responsive to determining the branch instruction is being executed and has previously executed:
    retrieving the address of the entry of the execution return address stack from the BIT entry;
    restoring an execution return address stack pointer with the address of the entry of the execution return address stack from the BIT entry;
    accessing with the execution return address stack pointer the execution return address stack at the address stored in the BIT entry.

18. The method as recited in claim 17, wherein determining the branch instruction is being executed for the first time comprises searching the BIT table for an entry corresponding to the branch instruction.

19. The method as recited in claim 18, further comprising recovering a speculative return address stack to a state of the execution return address stack responsive to the mis-speculation.

20. The method as recited in claim 18, further comprising clearing the entry corresponding to the branch instruction responsive to retiring the branch instruction.

* * * * *